United States Patent [19]

Wakabayashi et al.

[11] 4,232,869
[45] Nov. 11, 1980

[54] PICKUP CARTRIDGE

[75] Inventors: Takashi Wakabayashi, Ibaragi; Kazuhisa Morimoto, Settsu, both of Japan

[73] Assignee: Matsushita Electric Industrial Co., Ltd., Osaka, Japan

[21] Appl. No.: 938,497

[22] Filed: Aug. 31, 1978

[30] Foreign Application Priority Data

Sep. 8, 1977 [JP] Japan ................................ 52/108540
Sep. 9, 1977 [JP] Japan ................................ 52/109312

[51] Int. Cl.³ .............................................. G11B 3/18
[52] U.S. Cl. ...................................................... 274/37
[58] Field of Search ........................................ 274/37

[56] References Cited

U.S. PATENT DOCUMENTS 3,881,073   4/1975   Grado ................................ 274/37 X Primary Examiner—Charles E. Phillips
Attorney, Agent, or Firm—Wenderoth, Lind & Ponack

[57] ABSTRACT

A pickup cartridge for phonographic records, in which the damper material supporting an end portion of a cantilever is made of an elastomer comprising a blend polymer of a silicone rubber polymer and polyisobutylene. This damper material is advantageous for its high dampability and small temperature dependence of the dampability.

4 Claims, 3 Drawing Figures

Blend ratio of polyisobutylene
(weight parts)

Temperature (°C)

PICKUP CARTRIDGE

This invention relates to a pickup cartridge, particularly to a damper material which is an element in the vibration system of the pickup cartridge.

Conventionally, a rubber polymer comprising a butyl rubber polymer as a base is often used as a damper material supporting an end (bottom) portion of a cantilever of a pickup cartridge, because of its high dampability for damping resonance vibration in particular. However, such butyl-based rubber polymer has a large temperature dependence of its viscoelastic property. Thus, there is a disadvantage that the performances of a pickup cartridge, particularly frequency characteristics and traceability of tracing grooves of a record disc, which most correlate to resultant reproduced sound quality, are largely influenced by ambient temperature, and thus very much fluctuate with the fluctuation e.g. of room temperature.

From the view point of temperature dependence only, there are known quite excellent elastomers such as butadiene rubber and silicone rubber. However, these materials have poor dampability so that it has been difficult to bring these materials to practical use as a damper rubber for a pickup cartridge.

It is an object of this invention to provide a pickup cartridge having excellent dampability which can be kept stable even when ambient temperature changes.

This object is achieved according to this invention by providing a pickup cartridge comprising: a cantilever having a stylus mounted on one end portion thereof; and a damper material supporting the other end portion of said cantilever, said damper material being formed of an elastomer comprising a polymer blend of a silicone rubber polymer and polyisobutylene.

This invention will be described in detail with the aid of the accompanying drawings, in which.

Figure 1:
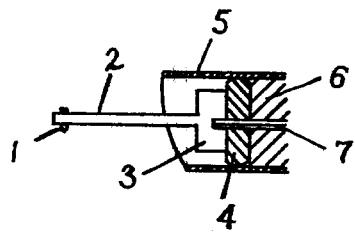
FIG. 1 is a schematic front view, partly in cross section, of a vibration system of a pickup cartridge.

Generally, a vibration system of a pickup cartridge is composed of a stylus for tracing grooves of a disc for receiving mechanical signals, a cantilever for transferring the mechanical signals, means for converting the mechanical signals to electric signals, and a damper rubber for supporting these vibrating elements and damping undesired vibrations. An example of such fundamental structure of a vibration system is shown in FIG. 1 using a moving magnet (M.M.) type cartridge. Referring to FIG. 1, reference numeral 1 is a stylus, 2 is a cantilever, 3 is a magnet, 4 is a damper rubber, 5 is a sleeve, 6 is a fixed end, and 7 is a tension wire.

The performances of such cartridge, particularly its frequency characteristics, are substantially determined by the dampability of the damper rubber. This dampability has an intimate relation with the viscoelastic property of the rubber material, particularly with its loss factor. Further, the compliance of the cartridge, which represents the traceability of the cartridge, has an intimate relation with the hardness and the elasticity of the damper rubber. Therefore, for improving the frequency characteristics and the compliance and the temperature dependencies of these factors, it is required to appropriately adjust the loss factor and the elasticity of the damper rubber, and to lower the temperature dependencies of these factors.

The damper according to this invention is composed mainly of an elastomer comprising, as a main component, a polymer made by blending a silicone rubber polymer and polyisobutylene. The advantage of this elastomer is that it has a loss factor comparable to that of a butyl-based rubber without damaging the excellent temperature dependence characteristics of the viscoelastic property of a silicone rubber.

The above elastomer of the damper will be described in detail hereinafter. As the silicone rubber polymer constituting the main portion of the elastomer, at least one of dimethyl silicone, methylphenyl silicone, methylvinyl silicone, methylphenylvinyl silicone, and fluorinated silicone can be used. Among these rubber polymers, trifluoropropylmethylvinyl silicone rubber polymer can form an elastomer having a particularly better dampability.

The polyisobutylene to be blended with the silicone rubber polymer can be in various forms from liquid form to solid elastic body form, depending on its degree of polymerization. For forming the damper elastomer to be used for a pickup cartridge of this invention, it is preferable that the polyisobutylene have a viscosity average molecular weight of between 5,000 and 50,000 measured according to the well known Standinger method, and have a semi-solid form. If the average molecular weight is smaller than 5,000, the affinity of the polyisobutylene with the silicone rubber polymer becomes too poor, so that the polyisobutylene would bleed out of the formed elastomer. On the other hand, if the average molecular weight is larger than 50,000, it would become too difficult to blend the polyisobutylene with the silicone rubber polymer, and furthermore, the glass transition temperature of the formed elastomer would shift to higher temperature side, so that the temperature dependence of the loss factor at room temperature would increase.

The dampability of the elastomer consisting essentially of the blend polymer made by blending the silicon rubber polymer with the polyisobutylene increases as the amount of the blended polyisobutylene increases. A preferred blend ratio is between 10 and 60 weight parts of polyisobutylene on the basis of 100 weight parts of uncured silicone rubber polymer. If the amount of the polyisobutylene is smaller than 10 weight parts, the effect of the polyisobutylene addition would be too little. On the other hand, if its amount is larger than 60 weight parts, there would be a disadvantage in that the polyisobutylene bleeds out of the elastomer upon the heating thereof at a high temperature.

The desired elastomer (damper) of any desired shape can be made by: adding, to the above blended polymer of the desired blend ratio, a curing agent for silicone rubber; further adding thereto a filler, an oil etc. if it is necessary to adjust properties such as viscosity and hardness; blending the thus treated material by a method which is used e.g. for manufacturing silicone rubber compounds; and curing the thus blended material at an appropriate temperature under an appropriate pressure. A fine powder of silica can be used as the filler, which can function to enforce and adjust the hardness of the resultant elastomer. A silicone oil, a fluorinated silicone oil, a fluorinated oil, etc. can be used for the oil, which can function to adjust the hardness of the elastomer which correlates to the compliance.

This invention will be described in further detail with reference to the following examples.

EXAMPLES 1 AND 2

50 weight parts of silica fine powder as an enforcing filler and 1 weight part of a curing agent were added to 100 weight parts of methylphenylvinyl silicone rubber polymer. With the thus prepared mixture was blended a polyisobutylene having a viscosity average molecular weight of about 10,000 in various blend ratios. Each of the thus made blends is designated here as Blend A. Meanwhile, 16 weight parts of silica fine powder as an reinforcing filler and 1 weight part of a curing agent were added to 100 weight parts of fluoropropylmethylvinyl silicone rubber polymer. With the thus prepared mixture was blended a polyisobutylene having a viscosity average molecular weight of about 20,000 in various blend ratios. Each of the thus made blends is designated here as Blend B. Each of Blends A and B was rollmixed for 15 minutes and was pressure-molded at a temperature of 170° C. for 10 minutes. From each of the thus pressure-molded materials, a test piece for testing impact resilience thereof and a damper for an M.M. cartridge were made.

The dampability of each of the thus made test pieces was evaluated by the impact resilience which correlates to the loss factor. When an impact is applied to each test piece, the test piece deforms with a certain deformation energy, and recovers with a certain recovery energy. The impact resilience is defined as the ratio of such recovery energy to such deformation energy. As the impact resilience decreases, the loss factor increases, and thus the dampability increases. Besides, the actual measurement of the impact resilience was carried out according to JIS-K6301 (Japanese Industrial Standard), which substantially corresponds to BS 903 (British Standard) and ASTM D 1054-55 (American Standard).

Figure 2:
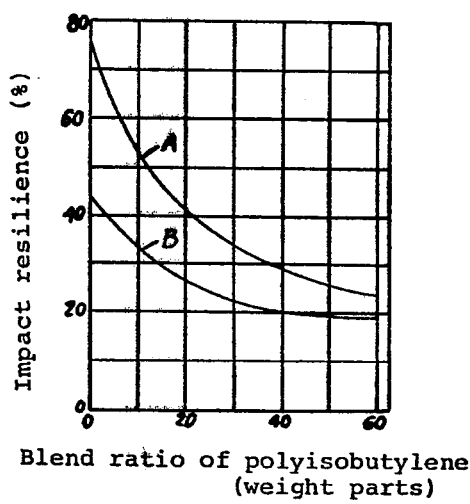
FIG. 2 is a graph showing the relation between dampability (impact resilience) of two examples of damper rubber materials according to this invention vs. the compositions of such materials.

FIG. 2 shows the results of the measurements performed at 20° C. Curve A shows the relation between the blend ratio of polyisobutylene in the elastomer using methylphenylvinyl silicone rubber polymer vs. impact resilience. Curve B shows the relation between the blend ratio of polyisobutylene in the elastomer using fluoropropylmethylvinyl silicone rubber polymer. As apparent from FIG. 2, the dampability of a silicone rubber can be remarkably improved by blending polyisobutylene therewith.

Next, a conventional butyl-based rubber was prepared, and also a rubber having impact resilience substantially the same as that of this conventional rubber at room temperature (20° C.) was selected from each of the above made rubbers using Blends A and B. These materials were subjected to the measurements of impact resilience at two more different temperatures (5° C. and 35° C.). The results of the measurements are shown in Table 1 below. As apparent from Table 1, the elastomer of silicone rubber polymer having polyisobutylene blended therewith has a smaller temperature dependence of impact resilience than the conventional butyl-based rubber.

TABLE 1

| | Rubber composition | | | | Impact resilience(%) | | |
|---|---|---|---|---|---|---|---|
| | Rubber polymer | Filler | Curing agent | Polyisobutylene | at 5° C. | at 20° C. | at 35° C. |
| example 1 | methylphenylvinyl Silicone | 50 | 1 | 50 | 22 | 24 | 26 |
| Example 2 | fluoroprophylmethylvinylsilicone | 16 | 1 | 30 | 18 | 22 | 28 |
| conventional sample | butyl-based rubber | | | | 8 | 22 | 40 |

Figure 3:
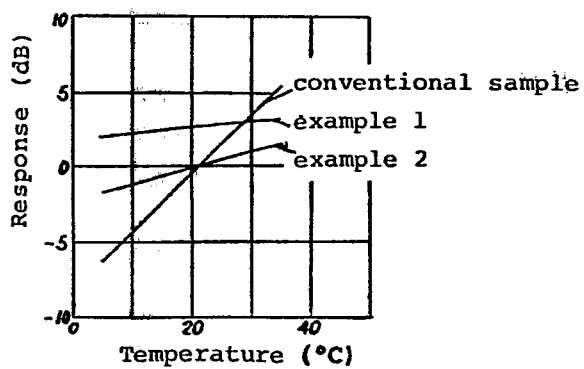
FIG. 3 is a graph showing temperature dependence of performances of examples of pickup cartridges according to this invention and those of a conventional sample for comparison.

Next, dampers made of the same elastomers as shown in Table 1, respectively, were mounted on an M.M. cartridge as shown in FIG. 1, and were subjected to the measurements of responses at 20 kHz (which is in audio frequency band and where temperature dependence of responses is known to be usually large) in the temperature range between 5° C. and 35° C. FIG. 3 shows the measured relationship between the responses vs. temperature.

As apparent from FIG. 3, the pickup cartridge of this invention has a very small temperature dependence of its frequency characteristics of response, which is very much improved over the conventional one.

Furthermore, it was confirmed that the compliance value according to the pickup cartridge of this invention, which value represents the traceability of the cartridge, was almost constant in the above measured temperature range.

The effects of this invention have been described, using the case of an M.M. cartridge as an example, but it is evident to those of average skill in the art that similar desired effects can be obtained also when this invention is applied to other pickup cartridges such as a pickup cartridge of the moving coil type.

What is claimed is:

1. A pickup cartridge comprising: a cantilever having a stylus mounted on one end portion thereof; and a damper material supporting the other end portion of said cantilever, said damper material being formed of an elastomer comprising a polymer blend of a silicone rubber polymer and polyisobutylene the blend ratio of said polymer blend is between 10 and 60 weight parts of said polyisobutylene on the basis of 100 weight parts of said silicone rubber polymer.

2. A pickup cartridge according to claim 1, wherein said silicone rubber polymer is one member selected from the group consisting of dimethyl silicone rubber polymer, methylphenyl silicone rubber polymer, methylvinyl silicone rubber polymer, methylphenylvinyl silicone rubber polymer and fluorinated silicone rubber polymer.

3. A pickup cartridge according to claim 2, wherein said fluorinated silicone rubber polymer is trifluoropropylmethylvinyl silicone rubber polymer.

4. A pickup cartridge according to claim 1, wherein the viscosity average molecular weight of said polyisobutylene is between 5,000 and 50,000.

* * * * *